3,496,710
STAND-UP GRASS SHEARS
Robert S. Smith and Jon Hedu, Woodbury, Conn., assignors to Seymour Smith and Son, Incorporated, Oakville, Conn., a corporation of Connecticut
Filed Jan. 20, 1967, Ser. No. 610,520
Int. Cl. A01g 3/06
U.S. Cl. 56—241
11 Claims

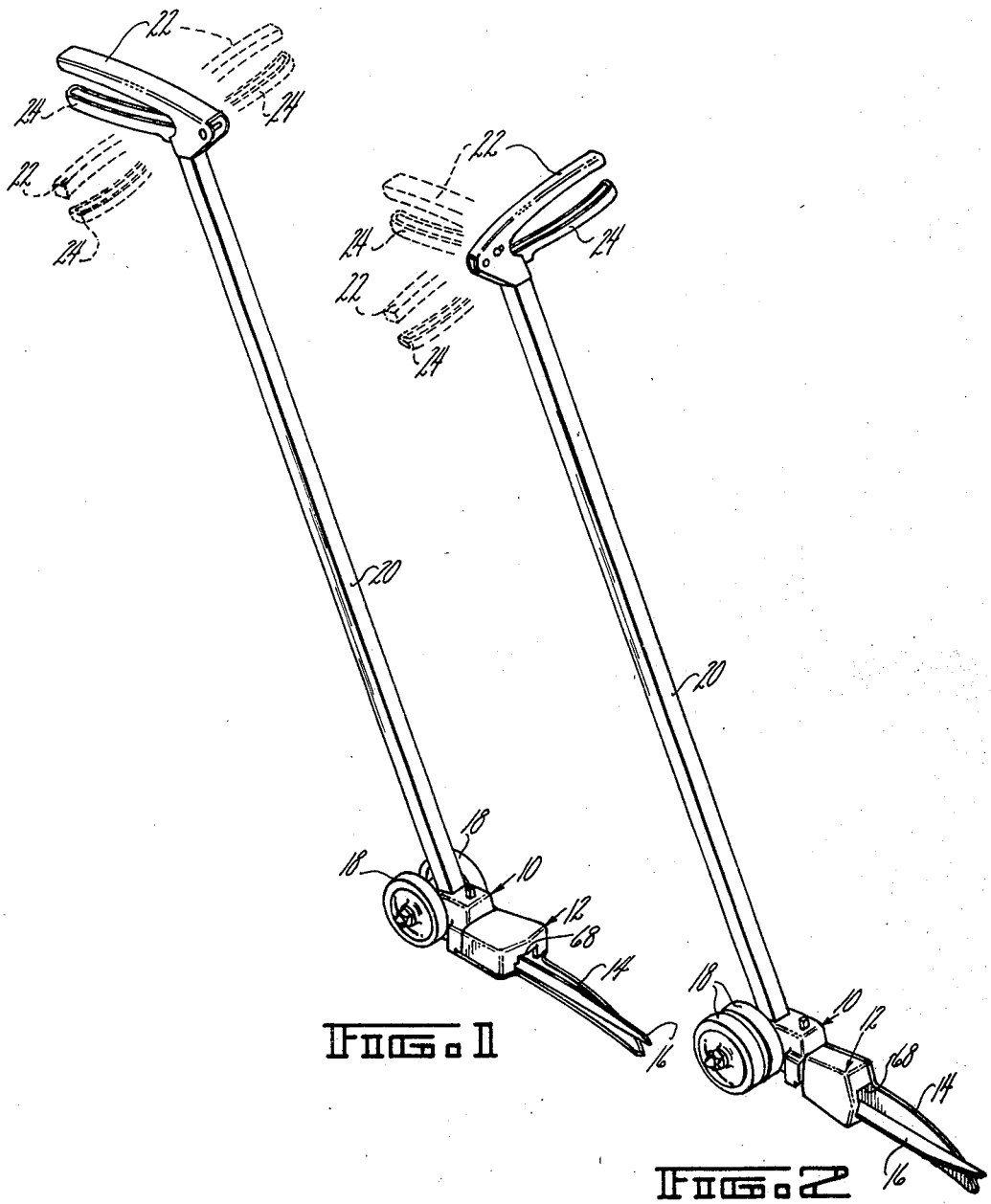

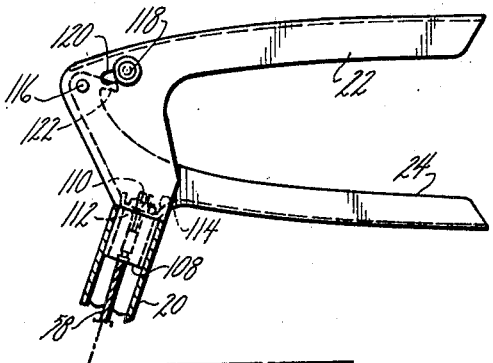
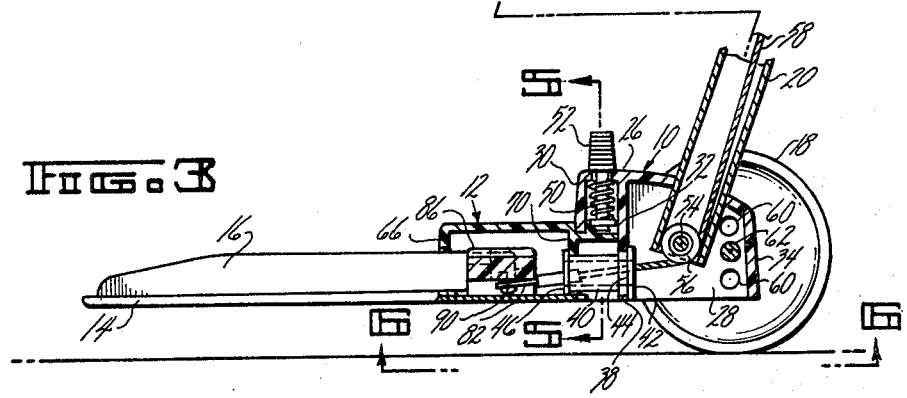
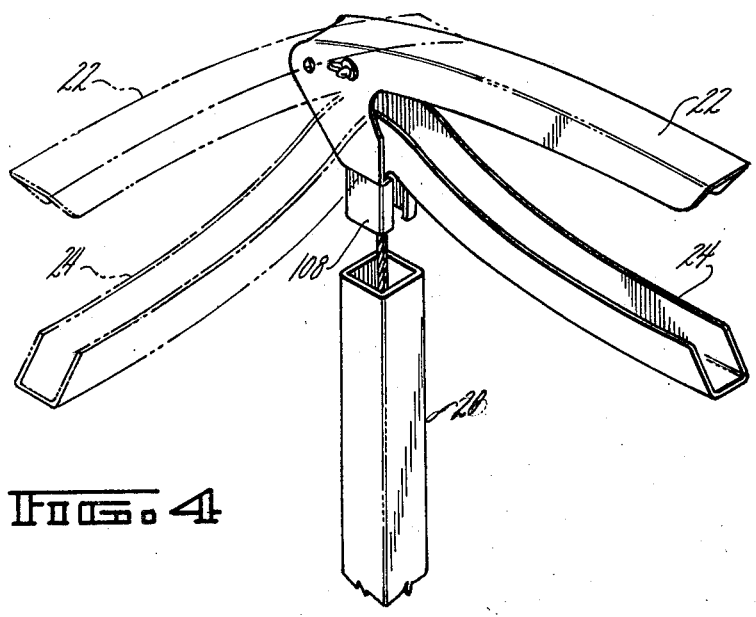

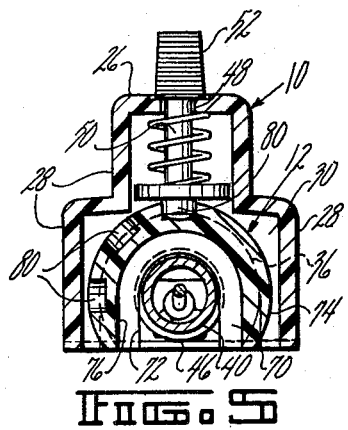

ABSTRACT OF THE DISCLOSURE

A manually operable grass shears of the type mounted on wheels and having an elongated shaft for stand-up operation and also having blades which can be tilted selectively for cutting in various planes such as the horizontal and vertical planes.

BACKGROUND OF THE INVENTION

There have been grass shears provided heretofore having the characteristics set forth in the foregoing abstract of the present disclosure, but their design and construction have entailed certain disadvantages. For example, the parts of known similar shears have been made entirely of metal, or almost entirely of metal, at relatively great expense in fabrication and assembly. Further, the design of prior shears of this type has been such that grass clippings and dirt become lodged around operating parts which must be cleaned and relubricated at fairly frequent intervals to maintain efficient operation. Further, the shears of this type which are known are designed specifically for use by a right-handed operator or by a left-handed operator and can be properly operated only when moved in one longitudinal direction along an adjacent wall, this to the disadvantage of a left-handed operator, for example, using a shears designed primarily for a right-handed operator.

SUMMARY OF THE INVENTION

It is the general object of the present invention to provide a grass shears particularly adapted for stand-up operation and which includes important parts capable of being manufactured of plastic in a plastic injection molding operation to achieve economy of manufacture; to provide parts for the shears which can easily and economically be assembled; to provide a complete and assembled shears which requires little or no lubrication and wherein the operating parts are not prone to collect grass clippings and dirt; and to provide such a shears with a handle which can easily and quickly be adjusted for the convenience of either a right-handed or left-handed person.

In keeping with this general object of the invention, the shears is designed to include first and second open bottom plastic injection molded housings which are easily connected together and assembled by a connecting bushing. The second housing supports the fixed and movable blades and it can be rotated relative to the first housing into selected positions wherein the blades are tilted to provide an angular cut or they are held in a more normal position for cutting in a horizontal plane. An elongated hollow staff or shaft extends upwardly from the first housing and a cable extends through this shaft from the movable blade to a handle located in a rectangular socket at the top of the shaft. This handle can be selectively positioned in the socket for the convenience of a left-handed or right-handed person for easy manipulation in performing the cutting operation. The cutting operation is made still easier by supporting the first housing on a pair of wheels which can be respectively located on opposite sides of the housing or both on one side of the housing for performing a special cutting operation.

BRIEF DESCRIPTION OF THE DRAWINGS

FIG. 1 is a perspective view of the shears with the blades set to perform a cutting operation in a horizontal plane.

FIG. 2 is a view similar to FIG. 1, but with the blades set to perform a cutting operation in a substantially vertical plane.

FIG. 3 is an enlarged vertical sectional view taken in a longitudinal plane through the shears.

FIG. 4 is a perspective view showing the upper end of the shears shaft or staff and illustrating the manner in which the operating handle can be selectively positioned relative to the shaft and shears.

FIG. 5 is a transverse sectional view on a more enlarged scale taken through the shears in a vertical plane as indicated generally by the line 5—5 of FIG. 3.

FIG. 6 is a bottom view of a portion of the shears taken as indicated by the line 6—6 of FIG. 3.

FIG. 7 is a view similar to FIG. 6 but with the bottom or fixed blade removed to reveal details of interior construction.

DESCRIPTION OF THE PREFERRED EMBODIMENT

As best shown in FIGS. 1 and 2, the principal components of a stand-up grass shears provided according to the present invention include a first or fixed housing 10, a second or tilt housing 12, a fixed shear blade 14, a movable shear blade 16, a pair of wheels 18, 18, an elongated shaft or staff 20, and a two-part handle at the top of the shaft comprising a fixed member 22 and an operating lever 24 pivotally connected thereto. It will be observed that the wheels 18, 18 are mounted on an axle extending transversely of the first or fixed housing 10 at the rear end thereof and that they can be placed one on each side of the housing or both on the same side of the housing as desired. It will also be seen that the shear blades 14 and 16 are carried by the second housing 12 forwardly of the first housing 10 and that the said second housing can be tilted relative to the first housing to select a cutting angle for the shears. It will further be seen that the shaft or staff 20 extends upwardly from the main housing 10 and that the handle comprising the parts 22 and 24 can selectively be positioned at the top of the shaft in different angular positions relative thereto.

Turning now to a more specific description of the aforementioned components, and with particular reference to the first housing 10 as best shown in FIGS. 3 and 5–7, it is to be noted that it is made of plastic and it is of such shape and configuration that it can be economically manufactured as an injection molded part. The said housing 10 includes a longitudinally extending top wall 26 and similarly extending side walls 28, 28. The housing 10 also has a transverse front wall 30, a second transverse wall 32 which is spaced rearwardly from the front wall 30, and the housing has a transverse rear wall 34, but it is open at the bottom.

The front transverse wall 30 of the housing 10 is provided with an arched notch 36 therein which is centrally located and which opens into the bottom edge of the said wall. That is, the notch 36 is formed with straight sides extending vertically upwardly and with a semicircular top. The rearwardly spaced transverse wall 32 has a centrally located circular opening 38 which is in longitudinal alignment with the arched notch in the front wall 30. The notched opening 36 and circular opening 38 are arranged in the walls 30 and 32 to receive a bushing 40 which is used to effect interconnection between the first or fixed housing 10 and the second or tiltable housing 12. As best shown in FIG. 3, the bushing 40 is assembled in the structure by thrusting it forwardly through the opening 38 until a flange 42 on its rear end engages the rear surface of the transverse wall 32. In such position, a shoulder 44 on the bushing 40 immediately adjacent the flange 42 fits snugly the opening 38 in the wall 32. Also in such position, the front end of the bushing 40 projects through the notched opening in the front wall 30, and said front end of the bushing is provided with a flange 46 of lesser diameter than the flange 42 and capable of being thrust through the opening 38.

In addition to the openings just mentioned, the housing 10 is provided with an opening 48 in its top wall 26 between the front and rearward transverse walls 30 and 32 to accommodate a detent plunger 50 which is spring-pressed downwardly to engage a portion of the second housing 12 (as will be described) and the said plunger has a finger grip 52 on top of or externally of the housing 10 for effecting manual disengagement of the detent. The top wall 26 of the housing 10 also has a square opening adapted to receive the lower end portion of the shank 20 which will be seen in FIGS. 3 and 4 to be hollow and of square cross section. The said lower end portion of the shank 20 is secured within the housing 10 by a smooth shank screw 54 extending transversely of the housing 10 with its head countersunk in one side wall 28 and with its other end threaded into the other side wall 28. The said screw 54 passes through the shaft 20 and it provides a convenient axle for rotatably mounting a pulley 56 at the bottom of the said shaft, the pulley being provided for a cable 58 which extends through the bushing 40 and up the hollow shaft 20. This cable interconnects the movable blade 16 and the operating lever 24 forming a part of the handle at the top of the shaft. The pulley 56 is exemplary of means that may be provided to support and guide the cable 58 between the bushing and shaft, but it is to be understood that other means can be provided for this purpose.

In addition, the housing 10 is provided with a series of vertically spaced holes 60, 60 (three shown) in each of its side walls 28. These holes are provided in alignment with each other in the respective side walls to provide for vertically adjustably supporting an axle bolt 62 for the wheels 18, 18. That is, the axle bolt 62 can be thrust transversely through the housing 10 from one side wall through the other side wall in any one pair of the openings 60, 60 to support the wheels 18, 18 on each side of the housing or both on the same side thereof and a nut 64 is threaded in place on the bolt 62 outside the wheels to hold the said axle bolt and wheels in place. Thus, the housing and shears structure generally can be supported by the wheels 18, 18 in adjusted vertical positions relative to the ground line as shown in FIG. 3.

Like the first housing 10, the housing 12 is formed as a plastic injection molded piece having an open bottom. It has a transverse front wall 66 provided with a generally rectangular opening 68 (FIGS. 1 and 2) to accommodate pivotal movement of the blade 16 relative to the blade 14 in the cutting operation to be described. The housing 12 also has a rear transverse wall 70 provided with a centrally located arched notch or opening 72 extending from the bottom edge thereof. That is, the notch 72 is formed with straight vertical sides extending from the bottom edge of the wall 70 upwardly, the notch being closed at the top in a semicircle. The notch 72 is of lesser size than the notched opening 36 in the front wall 30 of the housing 10, and the notch 72 is of the proper size to snugly embrace the body of the bushing 40 immediately to the rear of its front flange 46.

In addition, the housing 12 has a rearwardly projecting parti-cylindrical extension 74 which also has an arched bottom opening 76 therein which surrounds the bushing 40 in spaced relationship when the two housings are assembled as will be described. The diameter of the parti-cylindrical extension 74 is greater than the width of the arched notch 36 in the front wall 30 of the housing 10, but the said extension is provided with an external groove 78 to receive the said wall 30 in the arch 36 in the assembly of the housings. The extension 74 is also provided with a series of circumaxially spaced detent openings 80, 80 to receive the detent plunger 50 in rotated positions of the housing 12 relative to the housing 10.

It will be well at this point to consider the connection and assembly of the parts which have thus far been described in some detail. Starting with the housing 10, and with no other parts connected thereto, the detent plunger, which is shown to have a compression spring surrounding it, is pushed through the opening 48 from inside the housing. The detent plunger may be provided in various other specific forms, but in the form shown its projecting end is threaded to detachably receive the finger grip 52 which is then placed on the end of the plunger to limit its spring-biased inward movement to the position shown in FIGS. 3 and 5.

Then, the bushing 40 is thrust through the circular opening 38 in the transverse wall 32 of the housing 10 so that the bushing shoulder 44 is engaged in the opening 38 and with the large flange engaging the rear surface of the wall 32. Then, the housing 12 is inverted and thrust upwardly onto the bushing 40 with the arched notch 72 in the rear wall 70 of the housing 12 engaged behind the front flange 46 of the bushing. When the housing 12 has been thrust upwardly as far as it can go, it is rotated in a counterclockwise direction (as viewed from the front) to an upright position. In so doing, the detent plunger 50 will be thrust upwardly by engagement with the periphery of the parti-cylindrical projection 74, and the groove 78 in the said projection or extension will receive the front wall 30 of the housing 10 at its arched notch or opening 36. When the housing 12 is fully rotated to the upright position, the detent plunger 50 will be spring-biased downwardly and received in a notch 80 as shown in FIG. 5.

With the assembly or sub-assembly as thus far completed, an eye element 82 (FIGS. 3 and 7) is firmly secured to the front end of the cable 58 which is thrust rearwardly through the bore of the bushing 40. The cable is also extended through the length of the hollow shaft 20, and the pulley 56 is held in place at the bottom end of that shaft which is then thrust downwardly in the housing 10 to the position shown in FIG. 3. Then, the axle screw 54 for holding the shaft in place and for rotatably supporting the pulley 56 is extended through one side wall 28 in the housing 20 and threaded into the opposite side wall. The wheels 18, 18 can at this time be secured to the sub-assembly by the bolt axle 62 and nut 64, or the wheels can be put in place as the final step of assembly.

The next step in the construction or assembly of the shears is to mount the shear blades 14 and 16 on and in the second or front housing 12. The blade and housing assembly is much like that shown in the co-pending application of Robert S. Smith entitled Shears, Ser. No. 411,471, filed Nov. 16, 1964, to which reference may be made for a more specific description than is needed herein.

As shown and described in that application, the blade 14 is a fixed blade and covers the open bottom of the housing 12, being secured thereto as by a plurality of screws 84, 84. The blade 14 is normally disposed in a horizontal position, and the blade 16 is normally disposed in a vertical plane and it is pivotally supported within the housing 12 so as to sweep from an open position wherein its cutting edge is spaced from the cutting edge of the blade 14 to a closed position wherein its cutting edge is disposed over the blade 14 as shown in FIGS. 1 and 3. The rear end portion of the blade 16, which is disposed within the housing 12, is secured as described in the said copending application to a plastic blade support and pivot member 86 (FIG. 7). As shown in FIGS. 3 and 7, the said rear end portion of the movable blade 16 has a laterally bent tab 88 having a depending hook 90 formed thereon which projects below the support element 86 and is connected to the eye 82 on the front end or lower end of the cable 58.

The blade support and pivot element 86 has a pivot pin 92 integrally formed thereon in offset relationship with the blade 16 and which is suitably journalled in the top of the housing 12 and in an opening 94 (FIG. 6) provided in the fixed or bottom blade 14. A torsion spring 96 is coiled around the pivot pin 92 and has one end 98 anchored to the support member 86 and its other end 100 anchored or held by an ear 102 slashed upwardly from the fixed blade 14 as shown in FIGS. 6 and 7. As so arranged, the spring 96 biases the movable blade 16 to an open position relative to the fixed blade 14.

As previously mentioned, the detent plunger 50 is seated in a detent opening 80 in the housing extension 74 as shown in FIG. 5 to retain the housing 12 in an upright position relative to the first housing 10. This is the normal position for operation of the shears, and in this position of the second or blade housing 12, the fixed blade 14 is disposed in a horizontal plane and the movable blade 16 is disposed in a vertical plane and the cutting operation takes place in a horizontal plane. The housing 12 is additionally retained in this position relative to the housing 10 by a rearwardly projecting tab 104 on the blade 14 which engages in a notch 106 (FIG. 7) at one side of the bottom edge of the front wall 30 of the fixed housing 10. This tab and notch engagement prevents clockwise rotation of the housing 12 relative to the housing 10 (when viewed from the front) and thus inadvertent disassembly of the two housings is avoided. However, counter-clockwise rotation of the housing 12 relative to the housing 10 is permitted until the tab 104 engages the bottom edge of the front wall 30 of the housing 10 on the other side, and this engagement takes place before the housing 12 has been completely inverted, again to prevent inadvertent disassembly.

It will be seen with reference to FIG. 5 that there are three detent openings 80, 80 provided, one being spaced approximately 45° circumferentially from the detent opening engaged by the plunger 50 with the housing 12 positioned in an erect position for trimming in a horizontal plane and the other detent opening 80 being positioned substantially 90° from the erect detent opening. Thus, the housing 12 and its blade assembly can be retained in tilted or swivel positions wherein the fixed blade 14 is disposed at a 45° angle to the horizontal and wherein it is disposed substantially vertically. Thus, in addition to the normal cutting in a horizontal plane, the shears can be used to trim in a 45° plane and in a vertical plane. The inclined planes are most used in trimming grass at the edge of a sidewalk or at the edge of flowerbeds, etc. While trimming in the inclined planes, the operator may find it desirable to locate both wheels 18, 18 on one side of the housing 10 as shown in FIG. 2 so that the wheels will roll along the sidewalk or in the flowerbed for edge trimming or "edging."

As best shown in FIGS. 1, 2 and 4, the staff or shaft 20 is of rectangular cross sectional configuration, and it is preferably square. Thus, as shown in FIG. 4, the upper end of the shaft 20 provides a socket for the handle member 22 which has a square base 108 adapted to fit snugly within the upper end of the shaft in any one of four 90° positions. Normally, only one of three such positions will be selected, these being the positions indicated by the full and broken lines in FIGS. 1 and 2, and the selection of the position for the handle is left to the operator's choice. A right-handed operator will probably select either the full line position for the handle shown in FIG. 1 or the alternative broken line position shown in FIG. 2 while a left-handed operator will probably select either of the full line positions shown in FIGS. 1 and 2.

It will be seen in FIG. 3 that the upper or free end of the cable 58 is clamped in a sheath 110 having a threaded end received in a nut 112. The nut 112 is trapped in an indentation 114 in the bottom of the movable handle member or lever 24 which is of U-shaped cross section. Thus, the nut 112 is tightened on the sheath 110 and the cable 58 drawn taut by rotating the handle relative to the cable while the handle is out of or removed from the shaft socket.

Therefore, in the final step of assembly of the shears (except possibly for the attachment of the wheels) the nut is threaded onto the sheath by rotating the handle as described to draw the handle base 108 firmly against the top of the shaft 20, and the said base is inserted in the end of the shaft in the selected position. The operating spring 96 applies tension to the cable 58 drawing the handle base into the shaft and retaining it therein. If desired, a set screw (not shown) can be threaded through the top of the shaft 20 into the base 108 to secure it in selected position within the shaft.

The tightening of the handle on the cable sheath 110 preloads the operating spring 96 in the open position of the movable blade 16 relative to the fixed blade 14. This preloading sets the force needed to pivot the lever member 24 of the handle toward the fixed member 22 thereof in the operation of the shears which effects the closing or cutting stroke of the movable blade 16 relative to the fixed blade 14. This preloading of the operating spring and the application of tension to the cable 58 tends to bias the tip end of the blade 16 downwardly because the cable eye 82 is connected to the blade hook 90 near the bottom rearward edge of the blade 16 as shown in FIG. 3. Such biasing of the tip of the blade 16 is permitted because the plastic blade support and pivot member 86 has limited flexibility as described in the previously mentioned copending application. This biasing of the tip of the movable blade downwardly is important in that during closing of the blades, their cutting edges maintain a point contact which is necessary for efficient cutting operation.

It is important to observe in FIG. 3 that the lever member 24 of the handle is pivotally connected to the fixed handle member 22 on a pivot pin 116 at the front end thereof. Thus, as the lever is pivotally lifted, the cable 58 is pulled upwardly in the shaft 20 to effect closing of the blades in the cutting operation. When the lifting force is removed from the lever 24, the operating spring 96 returns the movable blade 16 to open position as described.

The shear blades can be locked in closed position for safe storage of the shears, and this is accomplished by a transverse latch pin 118 in the handle member 22. The said handle member is of inverted U-shaped cross section, and the latch pin 118 extends transversely thereof and is movable forwardly and rearwardly in a slot 120 provided in at least one side wall. The latch pin 118 engages beneath a hook-shaped appendage 122 formed on the inner end of the lever 24 and which is disposed over the latch pin 118 within the handle member 22 when the blades are closed. By thrusting the latch pin 118 beneath the appendage 122, the handle and blades will be retained in the closed position until the latch pin 118 is again retracted to the position shown in FIG. 3.

We claim:

1. A shears comprising first and second open bottom housings, the first housing being provided as a support for an operating handle structure and the second housing being provided as a support for a fixed and for a movable shear blade, a bushing supported by one of said housings for engagement by the other housing to effect connection therebetween, said other housing having a notch engageable with said bushing in an inverted position of said other housing which is then rotatable on the bushing toward an upright position, said other housing also having means formed thereon for engagement with said one housing when it has been rotated from its said inverted position to effect the said connection, and an elongated connector extending through said bushing between said movable blade and operating handle structure.

2. A shears as set forth in claim 1 wherein said bushing is supported by said first housing.

3. A shears as defined in claim 2 wherein detent means is movably supported in said first housing to engage and retain said second housing in selected rotated positions relative to said first housing and bushing.

4. A shears comprising an open bottom housing having a transverse front wall provided with an arched notch in its bottom edge and also having a second transverse wall spaced rearwardly from the front wall and provided with a circular opening in longitudinal alignment with said notch, a bushing seated in said circular opening and projecting forwardly through said notch, the said bushing having a rear flange engaging the second transverse wall and having a lesser flange on its front end, a shear blade support unit including a fixed blade and a movable blade and having a rearward parti-cylindrical extension which is provided with an open bottom arched longitudinal opening adapted to engage said bushing behind its front flange, said parti-cylindrical extension being also provided with an external groove adapted to receive the front wall of the housing at its arched notch whereby the blade support unit is connected to the housing by said bushing by inverting the support unit to engage the bushing and then rotating it to erect position, an operating handle connected with said housing and including a movable part, a cable extending through said bushing to interconnect said movable blade and movable part of the handle for cutting operation of the shears, and a spring biasing said movable blade in one direction relative to said fixed blade.

5. A shears as defined in claim 4 wherein said parti-cylindrical extension is provided with a plurality of circumferentially spaced detent notches, and a manually disengageable detent plunger is supported in said housing to engage the detent notches selectively to retain said blade support unit in selected angular disposition relative to said housing and about a longitudinal axis.

6. A shears as defined in claim 4 wherein an axle is supported transversely by said housing, at least one wheel is supported on said axle to engage the ground and to facilitate moving the shears longitudinally over the ground for trimming grass, an upwardly extending elongated hollow shaft is connected to said housing to receive said cable and defines a rectangular socket at its upper end, and wherein said operating handle has a rectangular base selectively positioned in said socket to select an angular disposition of the handle relative to the shaft.

7. A shears comprising an open bottom first housing having a transverse front wall provided with an arched notch in its bottom edge and also having a second transverse wall spaced rearwardly from the front wall and provided with a circular opening in longitudinal alignment with said notch, a bushing seated in said circular opening and projecting forwardly through said notch, the said bushing having a rear flange engaging the second transverse wall and having a lesser flange on its front end, an open bottom second housing having a rearward parti-cylindrical extension provided with an open bottom arched longitudinal opening adapted to engage said bushing behind its front flange and also provided with an external groove adapted to receive the front wall of the first housing at its arched notch whereby the first and second housings are connected by said bushing by inverting the second housing to engage the bushing and then rotating it on the bushing to erect position, a first shear blade secured to the bottom of the second housing, a second shear blade pivotally mounted in said second housing for cutting movement relative to the first blade, an operating handle connected with said first housing and including a movable part, a cable extending through said bushing to interconnect the second blade and movable part of the handle for cutting operation of the shears, and a spring biasing said second blade in one direction relative to said first blade.

8. A shears as defined in claim 7 wherein said parti-cylindrical extension is provided with a plurality of circumferentially spaced detent notches, and a manually disengageable detent plunger is supported in said first housing to engage the detent notches selectively to retain the second housing and blades in selected angular disposition relative to said first housing and about a longitudinal axis.

9. A shears as set forth in claim 8 wherein said first shear blade has a tab engageable with the bottom of the front wall of the first housing at one side thereof when the second housing is erect, the said tab also being engageable with the bottom of the front wall of the first housing at the other side thereof to prevent the second housing being fully inverted after connection with said first housing and after securing said first blade whereby to prevent inadvertent disconnection between the first and second housings.

10. A shears as set forth in claim 7 wherein an axle is supported transversely by said first housing, at least one wheel is supported on said axle to engage the ground and to facilitate moving the shears longitudinally over the ground for trimming grass, an upwardly extending elongated hollow shaft is connected to said housing to receive said cable and defines a rectangular socket at its upper end, and wherein said operating handle has a rectangular base selectively positioned in said socket to select an angular disposition of the handle relative to the shaft.

11. The shears of claim 10 wherein said first housing is adapted to support said axle at selected elevations, and there are a pair of wheels provided for the axle, each of which is adapted to be placed on either side of the said first housing.

References Cited

UNITED STATES PATENTS

| | | | |
|---|---|---|---|
| 1,869,295 | 7/1932 | Atterbury | 56—241 X |
| 2,759,319 | 8/1956 | Smith | 56—256 X |
| 2,957,297 | 10/1960 | Zoetemelk | 30—248 X |
| 3,039,190 | 6/1962 | Wallace | 30—248 |
| 3,327,390 | 7/1967 | Smith | 30—248 |
| 3,350,864 | 11/1967 | Sheps et al. | 56—25.4 |

F. BARRY SHAY, Primary Examiner

P. A. RAZZANO, Assistant Examiner

U.S. Cl. X.R.

30—248